United States Patent [19]
Shono

[11] Patent Number: 5,245,476
[45] Date of Patent: Sep. 14, 1993

[54] ZOOM LENS BARREL

[75] Inventor: Tetsuji Shono, Tokyo, Japan

[73] Assignee: Asahi Kogaku Kogyo Kabushiki Kaisha, Tokyo, Japan

[21] Appl. No.: 491,855

[22] Filed: Mar. 12, 1990

[30] Foreign Application Priority Data

Mar. 14, 1989 [JP] Japan .................. 1-28936[U]
Mar. 24, 1989 [JP] Japan .................. 1-73319

[51] Int. Cl.⁵ .................. G02B 15/14; G02B 7/02
[52] U.S. Cl. ..................... 359/699; 359/704; 359/819; 359/830
[58] Field of Search .............. 350/247, 252, 255, 257, 350/429, 430; 359/694, 695, 699–706, 819, 823, 825–830; 354/195, 195.1–195.13, 400, 402, 403, 286, 408

[56] References Cited

U.S. PATENT DOCUMENTS

| | | | |
|---|---|---|---|
| 3,437,404 | 2/1966 | Seedhouse | 359/699 |
| 3,744,884 | 7/1973 | Filipovich et al. | 359/826 |
| 4,210,387 | 7/1980 | Ogawa | 350/429 |
| 4,275,952 | 6/1981 | Uesugi | 359/699 |
| 4,307,951 | 12/1981 | Saito et al. | 354/195 |
| 4,322,151 | 3/1982 | Weiss | 350/429 |
| 4,386,829 | 6/1983 | Sumi | 350/429 |
| 4,484,800 | 11/1984 | Tamura | 354/195.12 |
| 4,523,815 | 6/1985 | Tomori | 350/430 |
| 4,564,264 | 1/1986 | Komoto | 350/255 |
| 4,582,350 | 4/1986 | Okajima | 350/429 |
| 4,681,406 | 7/1987 | Naito et al. | 359/699 |
| 4,822,153 | 4/1989 | Tomori et al. | 350/429 |
| 4,936,664 | 6/1990 | Haraguchi et al. | 350/430 |
| 4,948,227 | 8/1990 | Takeyasu | 350/255 |
| 4,974,949 | 12/1990 | Tanaka | 354/195.12 |
| 4,993,815 | 2/1991 | Yamazaki et al. | 359/699 |

FOREIGN PATENT DOCUMENTS

| | | |
|---|---|---|
| 58-42005 | 3/1983 | Japan . |
| 58-57807 | 4/1983 | Japan . |
| 58-100805 | 6/1983 | Japan . |
| 60-42722 | 3/1985 | Japan . |
| 836876 | 6/1960 | United Kingdom . |
| 1362504 | 8/1974 | United Kingdom . |
| 1373195 | 11/1974 | United Kingdom . |
| 2184864 | 7/1987 | United Kingdom . |

Primary Examiner—Bruce Y. Arnold
Assistant Examiner—Thong Nguyen
Attorney, Agent, or Firm—Sandler Greenblum & Bernstein

[57] ABSTRACT

A zoom lens barrel has first and second groups of lenses supported by respective lens frames and a cam mechanism which controls the axial position of at least one of the lens groups. The cam mechanism comprises a guide pin which is provided on the lens frame of the associated lens group to be controlled by the cam mechanism, a cam ring which is provided on its one end face with a cam surface with which the guide pin comes into contact, and a cam ring rotating mechanism which rotates the cam ring.

18 Claims, 4 Drawing Sheets

FIG. I

ZOOM LENS BARREL

BACKGROUND OF THE INVENTION

1. FIELD OF THE INVENTION

The present invention relates to a zoom lens barrel, and more precisely it relates to a position control mechanism and an advancing mechanism of a zoom lens.

2. DESCRIPTION OF RELATED ART

A zoom lens has at least two groups of lenses which are independently moved in the optical axis direction. At least one of the groups of lenses is moved non-linearly in the optical axis direction to change the focal length of the group(s) of lenses while keeping a constant focus point. On one hand, a multiple thread is used as means for providing linear movement, and on the other hand, means for providing non-linear movement is usually constituted by a cam mechanism which comprises a cam groove provided on the cylindrical wall of the barrel and a guide pin provided on a lens frame which is fitted in the cam groove so that the lens frame is guided in the optical axis direction.

The wall surface of the cam groove extends in the same direction as that of the guide pin at any place of the cam groove. Generally speaking, the guide pin extends in a radial direction from the center of the barrel, and accordingly the wall surface of the cam groove must be formed to extend toward the center of the barrel at any place thereof. A cam groove having such a profile must be machined.

However, the machining of the cam groove is very expensive. Multiple grooving of the cams having different complex cam profiles which cause the lenses to move non-linearly is even more expensive. One solution to a reduction of the manufacturing cost is to make the cam groove by plastic molding.

However, when the cam groove is formed on the cylindrical wall of the barrel, a molding die for molding the cam groove must be released or removed in a direction perpendicular to the axis of the barrel. As a result, the direction of the cam groove is parallel with the direction of removal of the molding die along the whole length of the cam groove, and accordingly, the cam groove can not be oriented toward the center of the barrel along the whole length, thus resulting in failure to an engagement of the guide pin projecting from the center of the barrel with the associated cam groove.

Furthermore, in a conventional zoom lens barrel, in case of a large movement of the lens groups, particularly the first lens group thereof, it is necessary to increase the axial length of a stationary barrel in order to increase the displacement of a linear movement ring which supports the first lens group, resulting in a large lens barrel in the axial direction.

SUMMARY OF THE INVENTION

The primary object of the present invention is to provide a control mechanism which can control the lens position without using the engagement of the cam groove and the guide pin.

Another object of the present invention is to provide a lens advancing mechanism which can provide an increased lens displacement without increasing the axial length of the stationary barrel.

One of the most significant features of the present invention is directed to the control of the position of the lenses by a cam surface (end face cam) which is formed on the end face of the cam ring, not by the engagement of the cam groove and the guide pin, as in the prior art mentioned above.

The control mechanism of the position of the lenses according to the present invention includes a lens frame which is movably supported in the optical axis direction, a cam ring which is relatively rotatable without changing the position of the optical axis with respect to the lens frame, a cam surface which is formed on an end face of the cam ring, a guide pin which is provided on the lens frame to engage with the cam surface, and a biasing mechanism for continuously biasing the lens frame to always maintain the guide pin in contact with the cam surface. In the lens position control mechanism mentioned above, since the cam surface of the cam ring is formed on the end face thereof, the whole ring can be plastic-molded, thus resulting in a decreased manufacturing cost.

The lens advancing mechanism according to the present invention is characterized by an intermediate linear movement ring provided between the stationary barrel and a linear movement ring, so that the resultant displacement of the intermediate linear movement ring and the linear movement ring can provide an ample displacement of the lenses.

The lens advancing mechanism according to the present invention includes a stationary barrel, an intermediate linear movement ring which is linearly movably supported by the stationary barrel, a linear movement ring which is linearly movably supported by the intermediate linear movement ring, a rotational ring which is rotatable relative to the intermediate linear movement ring and which moves in the optical axis direction together with the intermediate linear movement ring, and a group of lenses which is supported by the linear movement ring, wherein the rotational ring is located between the stationary barrel and the linear movement ring and is connected to each by helicoids.

The control mechanism of the lens position and the lens advancing mechanism in combination make it possible to mold the cam ring, including the cam surface, of synthetic resin and to provide a small zoom lens barrel having an increased displacement of the lenses.

Preferably, the zoom lens barrel comprises a linear movement ring which is linearly moved in the optical axis direction, a first group of lenses which is supported by the linear movement ring, a lens frame of a second group of lenses which is supported for movement in the optical axis direction by the linear movement ring, a cam ring which is rotatably supported by the linear movement ring, a cam surface which is formed on an end face of the cam ring, a guide pin which is provided on the lens frame of the second lens group to bear against the cam surface, and a rotational mechanism for the cam ring which rotates the cam ring in accordance with the linear movement of the linear movement ring.

The linear movement mechanism of the linear movement ring comprises a stationary barrel, an intermediate linear movement ring which is supported for linear movement by the stationary barrel, a linear movement ring which is supported for linear movement by the intermediate linear movement ring, and a rotational ring which rotates relative to the intermediate linear movement ring and moves in the optical axis direction together with the intermediate linear movement ring. The rotational ring is located between the stationary barrel and the linear movement ring and is connected to the both by helicoids respectively.

The rotational mechanism of the cam ring can be comprised of, for example, a guide pin which is provided on the cam ring and a spiral groove which is provided on the intermediate linear movement ring, so that the guide pin is fitted in the spiral groove.

BRIEF DESCRIPTION OF THE DRAWINGS

A detailed explanation of the present invention will be made in detail based on embodiments shown in the attached drawings, in which.

DESCRIPTION OF PREFERRED EMBODIMENTS

Figure 1:
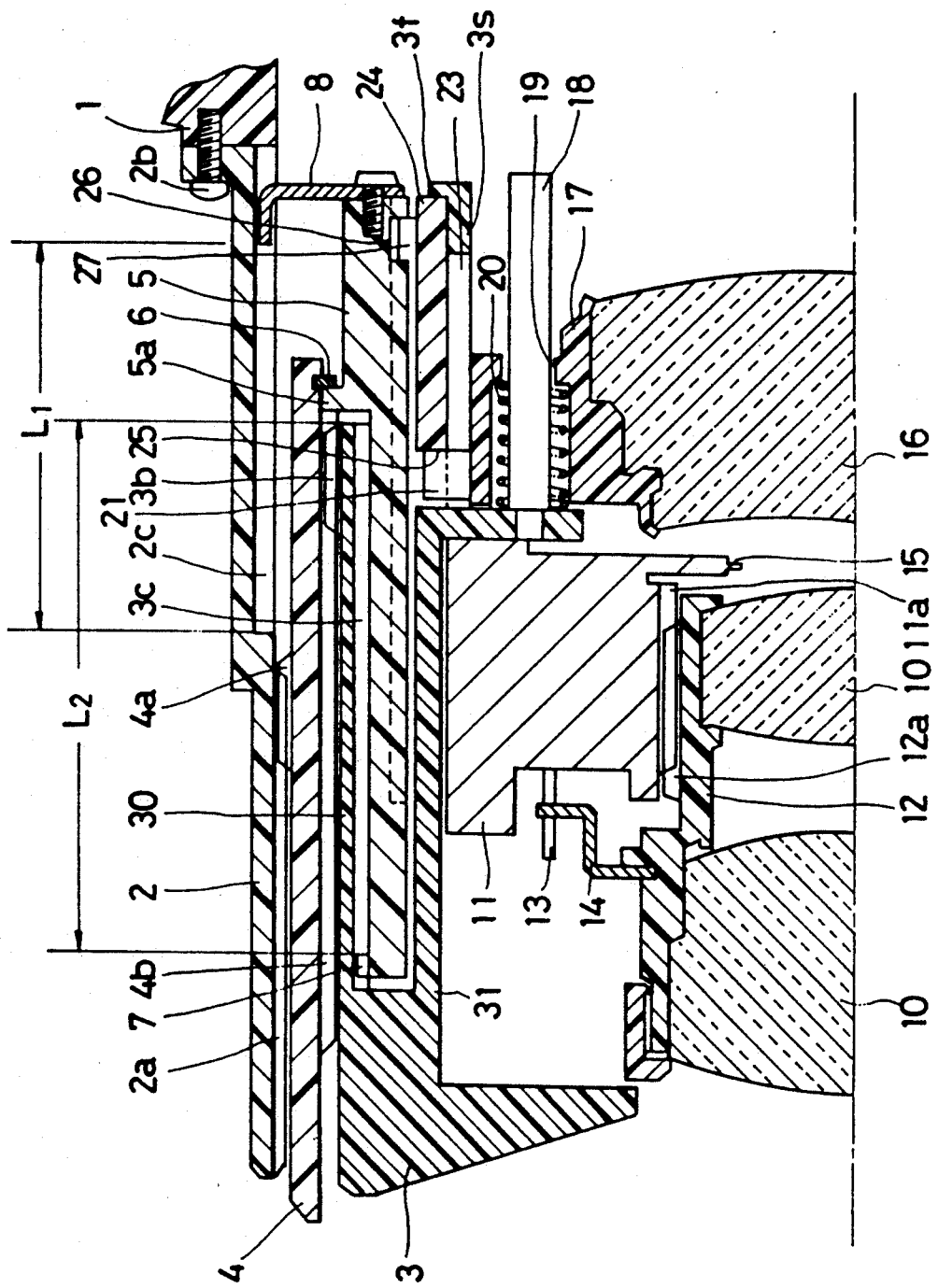
FIG. 1 is a longitudinal sectional view of a zoom lens barrel according to an embodiment of the present invention.

In FIG. 1 which shows a first embodiment of the present invention, a camera body 1 has a stationary barrel 2 secured thereto by set screws 2b. Alternatively, it is possible to detachably connect the stationary barrel to the camera body 1 by, for example, a bayonet mount.

The stationary barrel 2 is provided, on the inner peripheral surface of the front end thereof, with a first helicoid (multiple thread) 2a and on the rear end, with a first linear movement guide groove 2c which extends in the optical axis direction.

On the inner periphery of the stationary barrel 2 are fitted a rotational ring 4 and a linear movement ring 3 which is comprised of several components in combination, although drawn as a single piece for clarification. The linear movement ring 3 is in the form of a double-tube having an outer cylinder 30 and an inner cylinder 31. The outer cylinder 30 is provided, on its rear and outer periphery, with a second helicoid (multiple thread) 3b which has a right-hand thread (or left-hand thread) opposite to the first helicoid having a left-hand thread (or right-hand thread). The outer cylinder 30 is provided on its inner periphery with a second linear movement guide groove 3c which extends in the optical axis direction.

The inner cylinder 31 of the linear movement ring 3 has an annular shutter 11 secured thereto. The shutter 11 has an inner peripheral thread 11a in which a first lens frame 12 which supports the first lens group 10 is screwed through an outer peripheral thread 12a formed on the outer periphery of the first lens frame 12. The shutter 11 has an auto-focus drive pin 13 and a shutter sector 15. The pin 13 is integral with an operational plate 14 secured to the first lens frame 12 in the circumferential direction. The shutter 11 rotates the drive pin 13 by a predetermined angular displacement, in accordance with distance signals which are generated from an object distance measuring device to rotate the first lens frame 12 through the operational plate 14. As a result, the first lens frame 12, and accordingly, the first lens group 10 move in the optical axis direction in accordance with the threads 11a and 12a to effect the focusing. Thereafter, the shutter sector 15 opens to effect the exposure.

The rotational ring 4 is provided, on its outer periphery, with a helicoid (multiple thread) 4a which is engaged by the first helicoid 2a and on its inner periphery, with a helicoid (multiple thread) 4b which is engaged by the second helicoid 3b.

On the rear inner surface of the rotational ring 4, a flange portion 5a of an intermediate linear movement ring 5 is rotatably supported through a stop ring 6. The rotational ring 4 is rotatable relative to intermediate linear movement ring 5 and the intermediate linear movement ring 5 moves in the optical axis direction together with the rotational ring 4 by the engagement of the flange portion 5a and the stop ring 6.

The front end of the intermediate linear movement ring 5 is inserted in the outer cylinder 30 of the linear movement ring 3, so that the radial guide pin 7 projecting from the front outer surface of the linear movement ring 3 is engaged in the linear movement guide groove 3c. The engagement of the guide pin 7 in the linear movement guide groove 3c enables the intermediate linear movement ring 5 to linearly move relative to the linear movement ring 3 and prevents the intermediate linear movement ring 5 from rotating. Namely, the intermediate linear movement ring 5 and the linear movement ring 3 can linearly move in the optical axis direction without rotating. When the rotational ring 4 rotates, it is advanced relative to the stationary barrel 2 in accordance with the helicoids 2a and 4a, and the linear movement ring 3 is advanced relative to the rotational ring 4 in accordance with the helicoids 3b and 4b. The displacement (advance) of the first lens group 10 is equal to a resultant displacement (a sum of the displacements) of the rotational ring 3 relative to the stationary barrel 2 and the linear movement ring 3 relative to the rotational ring 4. In the illustrated embodiment, the maximum displacement of the first lens group 10 is (L1+L2) in FIG. 1. In other words, the inclination angles and the directions of the helicoids 2a (4a) and 3b (4b) are determined, so that the maximum value (L1+L2) can be obtained. Consequently, the rotational ring 4 and the linear movement ring 3, both having small axial lengths provide an increased axial displacement of the first lens group 10. This first feature is one of the most important features of the present invention. Note that the axial movement of the first lens group 10 in the optical axis direction is a linear movement proportional to the angular displacement of the rotational ring 4.

The second lens group 16 is secured to a second lens frame 17 which is fitted in an inner periphery of a small cylinder 3s which is formed at the rear end of the linear movement ring 3 to have a smaller diameter. The second lens frame 17 has holes 19 in which spaced axial guide rods 18 which are secured to the linear movement ring 3 at an angular distance of for example 120° are fitted, so that the second lens frame 17 is movable in the optical axis direction. The second lens frame 17 is continuously biased rearward by compression springs 20 which are provided to surround the respective guide rods 18.

Radial guide pins 21 are provided at an angular distance of 120° on the outer periphery of the front end of the second lens frame 17. The guide pins 21 project outward through linear movement guide grooves 23 formed on the small cylinder 3s of the linear movement ring 3. A cam ring 24 is rotatably fitted on the small cylinder 3s. The cam ring 24 has a cam surface 25 formed on the front end thereof. The guide pins 21 bear against the cam surface 25. Namely, the second lens frame 17 which is biased rearwardly by the compression springs 20 comes into contact with the cam surface 25 through the guide pins 21, so that the cam ring 24 is biased rearward through the guide pins 21. The rearward movement of the cam ring 24 is restricted by the outer flange 3f formed at the rear end of the small cylinder 3s, so that the cam ring 24 can not move in the optical axis direction.

Figure 2:
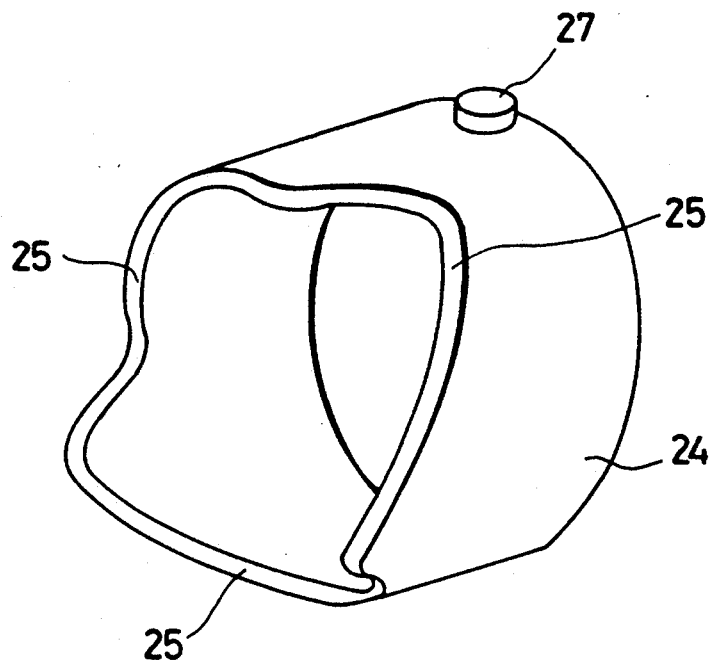
FIG. 2 is a perspective view of a cam ring shown in FIG. 1.
Figure 3:
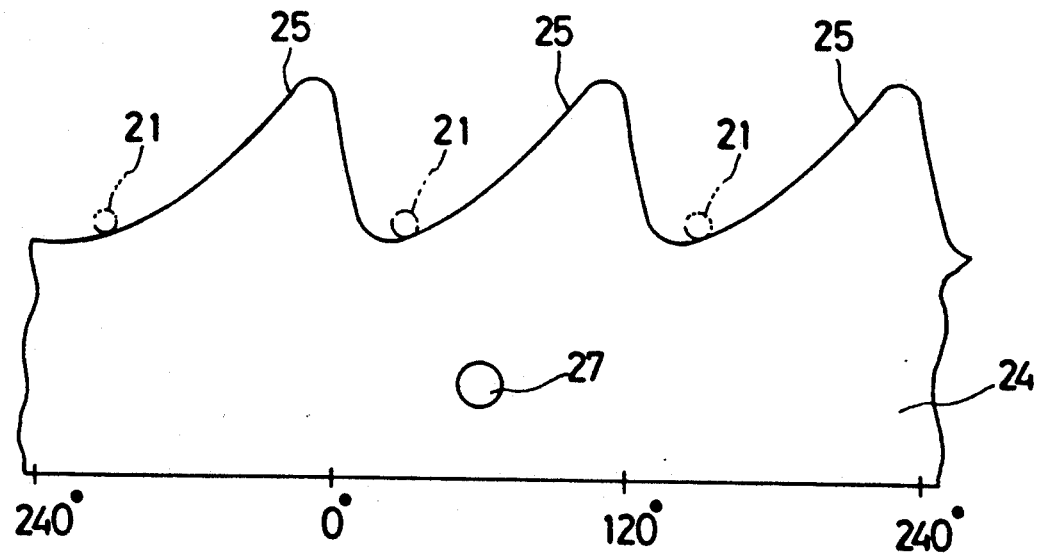
FIG. 3 is a developed view of a cam ring shown in FIG. 2.

The cam surface 25 has three identical cam surface portions which are spaced at an angular distance of 120°, corresponding to the guide pins 21, as shown in FIGS. 2 and 3. Consequently, the axial position of the second lens frame 17 (second lens group 16) is determined by the profile of the cam surface 25. If the cam ring 24 is made via a plastic mold, the cam surface 25 can be a vertical flat surface perpendicular to the optical axis, which surface can be formed by a molding die which is removed in the optical axis direction.

The cam ring 24 is provided on its outer periphery with a radial guide pin 27 which is fitted in a spiral groove 26 which is formed on the inner periphery of the intermediate linear movement ring 5. The spiral groove 26 has a constant inclination angle. Consequently, when the linear movement ring 3 moves relative to the intermediate linear movement ring 5 which can not rotate, the cam ring 24 which is rotatably supported by the linear movement ring 3 rotates. The rotational movement of the cam ring 24 is linearly proportional to the linear displacement of the linear movement ring 3. When the cam ring 24 rotates, the second lens frame 17 (second lens group 16) which is actuated by the cam surface 25 moves in the optical axis direction. The displacement of the second lens group 16 is determined by the cam profile of the cam surface 25 and is not proportional to the angular displacement of the cam ring 24. Namely, when the first lens group 10 linearly moves in the optical axis direction due to the rotation of the rotational ring 4, the non-linear movement of the second lens group 16 in accordance with the cam profile of the cam surface 25 takes place, so that the focal length can be changed by the movement of the first and second lens groups 10 and 16. Note that the rotational ring 4 is driven to rotate for example by a zoom gear mechanism (not shown).

Another, second feature of the present invention resides in the determination of the position of the second lens group 16 by the angular position of the cam ring 24 having the cam surface 25 at its front end.

In the zoom lens barrel according to the present invention, in addition to the stationary barrel 2, the linear movement ring 3, the rotational ring 4, the first lens frame 12, the second lens frame 17 etc. which are usually molded of plastic in the prior art, the intermediate linear movement ring 5 and the cam ring 24 can be molded of plastic. Namely, the spiral groove 26 which is formed in the intermediate linear movement ring 5 has a constant inclination angle and has a straight linear profile in a developed view, and accordingly, a molding die can be removed or released by rotating it along the spiral groove 26. The plastic molding is made possible by the formation of the cam surface 24 of the cam ring 25 at the front end thereof.

Figure 4:
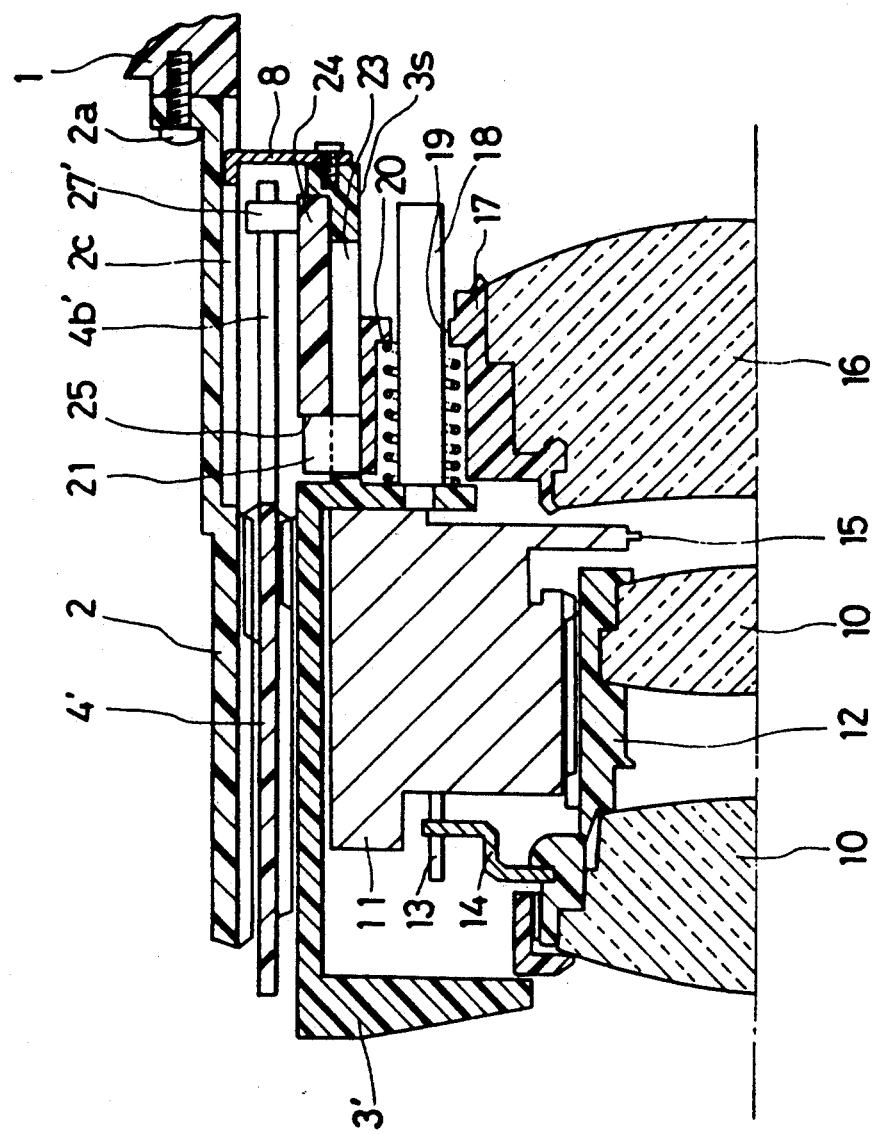
FIG. 4 is a longitudinal sectional view of a zoom lens barrel according to another embodiment of the present invention; and, FIG. 5 is a longitudinal sectional view of a zoom lens barrel according to still another embodiment of the present invention.

FIG. 4 shows another embodiment of the present invention, in which only the above-mentioned second feature in the first embodiment is embodied without the first feature. In the second embodiment shown in FIG. 4, the intermediate linear movement ring 5 of the first embodiment is removed, so that the guide plate 8 is directly connected to the rear end of the small cylinder 3s of the linear movement ring 3'. Since no intermediate linear movement ring 5 is provided, the linear movement ring 3' is not of a double-tube construction as in the first embodiment shown in FIGS. 1 through 3. Furthermore, the guide pin 27' of the cam ring 24 is fitted in the linear movement guide groove 4b', formed at the rear end of the rotational ring 4'. Therefore, the cam ring 24 rotates by the same angular displacement as that of the rotational ring 4', so that the rotational movement causes the second lens frame 17 to non-linearly move in the optical axis direction in accordance with the cam profile of the cam surface 25. The other construction features of the second embodiment are the same as of the first embodiment. The components of the second embodiment corresponding to those of the first embodiment are designated with the corresponding reference numerals.

The above-mentioned advantages derived from the formation of the cam surface 25 on the front end of the cam ring 24 in the first embodiment can be expected also in the second embodiment. Note however that the axial displacement of the linear movement ring 3' is restricted by the length of the first linear movement guide groove 2c formed on the stationary barrel 2. Therefore, the second embodiment can be more advantageously applied to a zoom lens barrel in which the axial displacement of the lenses is smaller than that in the first embodiment.

Figure 5:
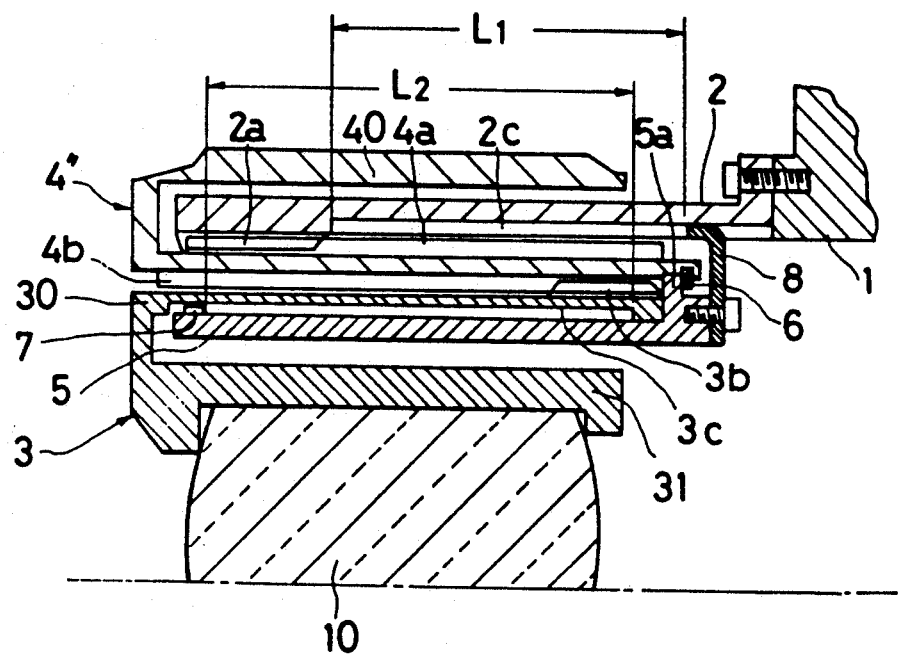

FIG. 5 shows another embodiment of the present invention, in which only the above-mentioned first feature of the first embodiment is realized without the second feature, contrary to the second embodiment shown in FIG. 4. Accordingly, there is no constituent features on the cam ring 24. Furthermore, in the third embodiment shown in FIG. 5, the cam ring 4" has an outer cylinder 40 which is located outside the stationary barrel 2, so that the rotational ring 4" can be manually rotated. Since the third embodiment is directed to a displacement mechanism of the first lens group 10, there is no restriction as to the provision of the second lens group or other lens group on the linear movement ring 3.

According to the third embodiment shown in FIG. 5, the maximum axial displacement of the first lens group 10 is given by a resultant displacement of the linear displacement L1 of the linear movement ring 3 which is caused by the rotation of the rotational ring 4" and the linear displacement L2 of the intermediate linear movement ring 5.

The present invention is not limited to the illustrated embodiments mentioned above and can be modified without departing from the spirit of the invention.

I claim:

1. A zoom lens barrel comprising: at least first and second groups of lenses supported by respective lens frames; a cam mechanism which controls an axial position of at least one of said first and second groups of lenses; and means, axially movable in an optical axis direction for providing a relatively larger axial displacement of another one of said first and second groups of lenses with respect to the axial displacement of said axially movable means, wherein said cam mechanism comprises a guide pin provided on said lens frame of said lens group to be controlled by said cam mechanism, a cam ring which is provided on one end face with a cam surface with which said guide pin comes into contact, and a cam ring rotating mechanism which rotates said cam ring.

2. A zoom lens barrel according to claim 1, wherein said lens group to be controlled by said cam mechanism is said second lens group, and wherein said zoom lens barrel further comprises a linear movement ring having a helicoid mechanism and which is linearly moved in the optical axis direction by said helicoid mechanism, said first lens group being supported by said linear movement ring.

3. A zoom lens barrel according to claim 2, wherein said axially movable means comprises a stationary barrel, an intermediate linear movement ring which is linearly movably supported by said stationary barrel and a rotational ring which is capable of rotating relative to said intermediate linear movement ring and moving linearly together with said intermediate linear movement ring in an optical axis direction, said rotational ring being located between said stationary barrel and said linear movement ring and being connected to both said stationary barrel and said linear movement ring by threaded engagement, and said linear movement ring being linearly movably support by said intermediate linear movement ring.

4. A zoom lens barrel according to claim 3, wherein said cam ring is supported by said linear movement ring so as to move together with said linear movement ring in the optical axis direction and rotate relative to said linear movement ring.

5. A zoom lens barrel according to claim 4, wherein said lens frame of said lens group to be controlled by said cam mechanism is supported by said linear movement ring to linearly move and is continuously biased rearward by a bias means so that said guide pin is pressed against said cam surface of said cam ring by the biased lens frame.

6. A zoom lens barrel according to claim 3, further comprises helicoids between said rotational ring and said stationary barrel and between said rotational ring and said linear movement ring to connect said rotational ring and said stationary barrel and connect said rotational ring and said linear movement ring, respectively.

7. A zoom lens barrel according to claim 6, wherein said helicoid between said rotational ring and said stationary barrel and said helicoid between said rotational ring and said linear movement ring have oppositely directed threads.

8. An advancing mechanism of a lens comprising: a stationary barrel; an intermediate linear movement ring which is linearly movably supported by said stationary barrel; a linear movement ring which is linearly movably supported by said intermediate linear movement ring; a rotational ring, having inner and outer threaded surfaces with respect to an optical axis of said lens, which is mounted for rotation relative to said intermediate linear movement ring and for moving together with said intermediate linear movement ring in an optical axis direction; and a group of lenses supported by said linear movement ring, said rotational ring being located between said stationary barrel and said linear movement ring and being connected to both said stationary barrel and said linear movement ring by thread engagement at said inner and outer threaded surfaces.

9. An advancing mechanism according to claim 8, further comprising helicoids between said rotational ring and said stationary barrel and between said rotational ring and said linear movement ring to connect said rotational ring and said stationary barrel and to connect said rotational ring and said linear movement ring.

10. An advancing mechanism according to claim 9, wherein said helicoid between said rotational ring and said stationary barrel and said helicoid between said rotational ring and said linear movement ring have oppositely directed threads.

11. An advancing mechanism according to claim 8, wherein said linear movement ring is a substantially double-walled tube having an outer cylinder and an inner cylinder.

12. An advancing mechanism according to claim 11, wherein said outer cylinder is provided, on its inner surface, with a linear movement guide groove which guides the linear movement of said intermediate linear movement ring.

13. A zoom lens barrel comprising:
a linear movement ring capable of linearly moving in an optical axis direction, a first group of lenses, said first group of lenses being supported by said linear movement ring, a lens frame of a second group of lenses which is movably supported in the optical axis direction by said linear movement ring, a cam ring which is rotatably supported by said linear movement ring, a cam surface which is formed on an end face of said cam ring, a guide pin which is provided on said lens frame of said second lens group to bear against said cam surface, a rotational mechanism which rotates said cam ring in accordance with the linear movement of said linear movement ring and means, axially movable in the optical axis direction, for providing a relatively larger axial displacement of at least one of said groups of lenses with respect to the axial displacement of said axially movable means.

14. A zoom lens barrel according to claim 13, wherein said axially movable means comprises a stationary barrel, an intermediate linear movement ring which is linearly movably supported by said stationary barrel, and a rotational ring which rotates relative to said intermediate linear movement ring and moves in the optical axis direction together with said intermediate linear movement ring, and said linear movement ring is linearly movably supported by said intermediate linear movement ring.

15. A zoom lens barrel according to claim 14, wherein said rotational ring is located between said stationary barrel and said linear movement ring and is connected to both said stationary barrel and said linear movement ring by thread engagement.

16. A zoom lens barrel according to claim 13, wherein said rotational mechanism of said cam ring is comprised of a guide pin which is provided on said cam ring and a spiral groove which is provided on said intermediate linear movement ring, said guide pin being fitted in said spiral groove.

17. A control mechanism of an axial position of a lens comprising: a first lens frame which is movably supported in an optical axis; a cam ring relatively rotatable with respect to said first lens frame; a cam surface formed on an end surface of said cam ring; a guide pin provided on said first lens frame to engage said cam surface; biasing means for continuously biasing said first lens frame to always bring said guide pin into contact with said cam surface; a rotation mechanism for rotating said cam ring; and means axially movable for providing a relative larger axial displacement of a second lens frame with respect to the axial displacement of said axially movable means.

18. A control mechanism according to claim 17, wherein said rotation mechanism comprises a guide pin which is provided on said cam ring and an annular member which rotates relative to said cam ring and which has a spiral groove in which said guide pin is fitted.

* * * * *